United States Patent
Mantin

(10) Patent No.: US 9,609,629 B2
(45) Date of Patent: *Mar. 28, 2017

(54) METHOD AND APPARATUS FOR EFFICIENT TRANSMISSION OF UNMANAGED OVER-THE-TOP STREAMS OVER CELLULAR COMMUNICATION NETWORKS

(71) Applicant: imVision Software Technologies Ltd., Ramat Gan (IL)

(72) Inventor: Sharon Mantin, Tel Aviv (IL)

(73) Assignee: Imvision Software Technologies Ltd., Ramat Gan (IL)

( * ) Notice: Subject to any disclaimer, the term of this patent is extended or adjusted under 35 U.S.C. 154(b) by 265 days.

This patent is subject to a terminal disclaimer.

(21) Appl. No.: 14/341,025

(22) Filed: Jul. 25, 2014

(65) Prior Publication Data

US 2015/0029925 A1 Jan. 29, 2015

Related U.S. Application Data

(60) Provisional application No. 61/858,134, filed on Jul. 25, 2013.

(51) Int. Cl.
*G06F 15/16* (2006.01)
*G06F 15/177* (2006.01)
(Continued)

(52) U.S. Cl.
CPC ......... *H04W 72/005* (2013.01); *H04L 65/608* (2013.01)

(58) Field of Classification Search
CPC .......................... H04W 72/005; H04L 65/608
See application file for complete search history.

(56) References Cited

U.S. PATENT DOCUMENTS

| 8,117,259 B2 | 2/2012 | Macwan |
| 2012/0192230 A1* | 7/2012 | Algie ............... H04N 21/23430 725/38 |

(Continued)

FOREIGN PATENT DOCUMENTS

| WO | 2011059848 A1 | 5/2011 |
| WO | 2011133197 A1 | 10/2011 |
| WO | 2013057315 A2 | 4/2013 |

OTHER PUBLICATIONS

Bouten et al., "A Multicast-Enabled Delivery Framework for QoE Assurance of Over-The-Top Services in Multimedia Access Networks"; Journal of Network and Systems Management, DOI 10.1007/s10922-013-9262-8, published online Jan. 17, 2013; Springer Science+Business Media, New York.

(Continued)

*Primary Examiner* — Gerald Smarth
(74) *Attorney, Agent, or Firm* — M&B IP Analysts, LLC

(57) ABSTRACT

A system and method for delivery of unmanaged over-the-top (OTT) streams in a cellular network are provided. The method includes monitoring unmanaged OTT streams flow in the cellular network; determining if at least one of the monitored unmanaged OTT streams can be delivered as an OTT stream in a multicast format; reformatting the at least one unmanaged OTT stream into a multicast OTT stream, if the at least one unmanaged OTT stream can be delivered in a multicast format; and delivering the at least one unmanaged OTT stream as a multicast OTT stream to a user edge device over the cellular network.

19 Claims, 5 Drawing Sheets

(51) Int. Cl.
    *H04W 72/00*     (2009.01)
    *H04L 29/06*     (2006.01)

(56) References Cited

U.S. PATENT DOCUMENTS

| | | | |
|---|---|---|---|
| 2013/0013688 A1* | 1/2013 | Wang .................. | H04L 61/1541 709/204 |
| 2013/0132986 A1 | 5/2013 | Mack et al. | |
| 2014/0129570 A1* | 5/2014 | Johnson ............. | H04N 21/4126 707/748 |
| 2014/0280878 A1* | 9/2014 | Hardin .................. | H04L 41/145 709/224 |

OTHER PUBLICATIONS

The International Search Report and the Written Opinion of the International Searching Authority for PCT/US2014/048162, ISA/RU, Moscow, Russia, Date of Mailing Jan. 15, 2015.

\* cited by examiner

METHOD AND APPARATUS FOR EFFICIENT TRANSMISSION OF UNMANAGED OVER-THE-TOP STREAMS OVER CELLULAR COMMUNICATION NETWORKS

CROSS-REFERENCE TO RELATED APPLICATIONS

This application claims the benefit of U.S. Provisional Application No. 61/858,134 filed on Jul. 25, 2013, the contents of which are hereby incorporated by reference.

TECHNICAL FIELD

The present invention relates generally to transmission of live over-the-top (OTT) streams and, more particularly, to efficient transmission of unmanaged OTT streams over cellular communication networks.

BACKGROUND

The world of digital delivery of multimedia content to viewers has been rapidly progressing. Typical types of multimedia content include video clips, electronic games, and interactive content. The delivery process for such multimedia content, particularly those transmitted in a form of video, may entail use of a variety of delivery standards, video quality levels, and other parameters. The techniques used in traditional television (TV) broadcast cannot be effectively used in the more modern multi-standard digital TV arena. Currently, only piecemeal solutions are available for efficient and seamless delivery of such multimedia content to the arena of digital TV.

Specifically, content delivery is currently performed using two main approaches: legacy content distribution and over-the-top (OTT) content distribution. Legacy content providers include, for example, cable, satellite, and internet protocol TV (IPTV) providers. Typically, such providers have full control over the entire delivery chain from a central location where the content is originated and transmitted (head-end) through the network to the end user's device (e.g., a set-top box). Therefore, legacy content providers can manage and guarantee efficient content delivery mechanisms and high Quality of Experience (QoE) to the end user.

Over-the-top (OTT) content distribution is the delivery of audio, video, and other types of multimedia content over the Internet typically without any control of the content distribution by the network operators and/or by the content providers. The providers of OTT content are typically third party providers which utilize the network's infrastructure to provide content to their subscribers. As such, OTT content providers are not responsible for controlling redistribution of the content. Examples for OTT content providers are Hulu®, Netflix®, and the like.

In most cases, OTT content providers control only the edges of a content distribution network. These edges are typically HTTP media streaming servers connected in the Internet and the media players installed in user devices. The media is streamed from the media servers toward each of the end user's devices as a transmission control protocol (TCP) based unicast stream. Such streams consume network resources (e.g., bandwidth per each content consumer) through the path between the media streaming server and end user device. This architecture results with a linear growth of network resources where each added consumer increases the consumed network resources. However, as noted above, OTT content providers have no control over the distribution network. Rather, such providers merely utilize the network's infrastructure to deliver content. As such, OTT content providers are not responsible for the overall efficiency of OTT content distribution over the network and, as such, cannot guarantee high QoE to their subscribers.

The popularity of OTT services downgrades the overall performance of the communication networks managed by ISPs, cellular operators, and fix-line operators. Specifically, OTT content delivery significantly increases the bandwidth consumption in such networks. As a result, ISPs cannot ensure high Quality of Service (QoS) to their subscribers, thereby forcing ISPs to upgrade their networks to support the increased demand for bandwidth. In addition, congested networks cause higher packets loss and longer packet delays, thereby downgrading the QoE of OTT streaming services.

Various types of OTT content or streams can be streamed over a network. For example, the type of the streamed content may be live, linear, replicated, or recorded. A live OTT stream is a transmission of a live content (e.g., a sports match, a concert, news, etc.). A linear stream is a broadcasted content, such as a TV show broadcasted over the Internet. In both live and linear OTT streams, all viewers watch the same stream substantially at the same time. In contrast, recorded content such as, e.g., content from a video on demand (VoD) service, may be viewed by different viewers in asynchronous manners, i.e., each user can start watching the recorded content at any time, and the viewing times of users may fully overlap, may partially overlap, or may not overlap at all.

Streamed OTT content can be delivered in two forms: managed and unmanaged. The managed OTT content refers to content owned by a network operator that is delivered by the operator or through one of its partners. As such, the network operator controls the media streaming server and, therefore, can determine if the delivered content can be multicasted, as well as the number of concurrent viewers of the streamed content. The unmanaged OTT content refers to content being delivered transparently over the network. As such, the network operator does not have any information regarding the type of the content being streamed or the number concurrent viewers.

FIG. 1 shows a schematic diagram of an end-to-end multimedia broadband multicast system 100 for delivery of OTT managed content. A user equipment device (UED) 110 is connected to a cellular network 120 through a unicast communication channel 145 and, optionally, to a broadcast and multicast communication channel 135. The UED 110 typically executes a media player that plays the streamed content.

A content provider (not shown) provides the UED 110 with a portal to access the content via a browser or application installed on UED 110. The content provider streams managed OTT content from a streaming server 150 to the UED 110 through the cellular network 120. The delivery of the OTT managed content can be performed through two sub-networks: a multimedia broadcast multicast service (MBMS) network 130, and a packet data network 140.

In cellular networks, a MBMS (also known as eMBMS) is a standardized service which enables broadcast and multicast services of managed OTT content over cellular networks. The MBMS network 130 defines a point-to-multi-point interface for existing and upcoming 3GPP-based cellular networks, such as defined in the 3GPP standard specifications 3GPP TS 22.246, 43.246, 36.440, 25.346, 23.346, and 22.146 . The MBMS is designed to provide efficient delivery of broadcast and multicast services, both within a cell as well as within the core network. For broadcast transmissions across multiple cells, the MBMS defines transmission via single-frequency network (SFN) configurations. Target applications include mobile television and radio broadcasting, as well as file delivery and emergency alerts. Delivery of content over the MBMS requires collaboration between the content owner and/or CDN and the cellular network operator.

The MBMS network 130 is further described with respect to FIG. 2. The architecture shown in FIG. 2 is MBMS network 130 defined for long term evolution (LTE)-based cellular networks (also known as an eMBMS). An E-UTRAN 210 is a LTE radio network connection that connects the UED 110 (not shown in FIG. 2) with a cellular network (e.g., cellular network 120 (not shown in FIG. 2)). Such connection is typically provided via the broadcast multicast communication channel 135.

The MBMS network 130 includes a mobility management entity (MME) 220 that is responsible for the control and signaling of the network 130. The E-UTRAN 210 receives content via the broadcast and multicast communication channel 135. Additionally, the E-UTRAN 210 is connected to a MBMS gateway (MBMS-GW) 230, which provides multicast and broadband transmissions. The MBMS-GW 230 is further communicatively connected to a broadcast multicast service center (BM-SC) 240, which is responsible for connecting between the source of the content (not shown) and the MBMS network 130.

Referring back to FIG. 1, the packet data network 140 carries unicast data services. As illustrated in FIG. 3, a typical packet data network 140 includes an E-UTRAN 310 which is an LTE radio network connection that connects the UED 110 with the cellular network. Such connection is typically provided via unicast communication channel 145. The cellular connectivity is facilitated by a MME 320 which provides control and signaling of the packet data network 140, a service gateway (S-GW) 330 that provides packet routing and forwarding, and a packet data network gateway (P-GW) 340. The P-GW 340 is a link between the mobile device and the services that reside in an external packet network.

To summarize the above discussion, in conventional solutions, unicast OTT streams would be delivered through the packet data network 140 while managed OTT streams would be delivered through the MBMS (or eMBMS) network 130.

Existing solutions for multicasting OTT stream content are discussed in the related art. However, such solutions are limited to delivery of managed OTT content over a cellular network. In particular, the existing solutions require collaboration between a content owner and/or its content delivery network (CDN) and the cellular network's operator. The collaboration includes designating which streams will be multicasted, provisioning the multicast and/or broadcast service over the mobile network, provisioning required resources in the MBMS network 130 and UED 110. The provisioning must be performed a-priory before the content is streamed to users. As an example, such provisioning is performed before broadcasting of a live sport event. This further limits the efficiency of multicasting solutions for OTT content cellular communication networks.

It would therefore be advantageous to provide a solution that would overcome at least the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor delineate the scope of any or all embodiments. Its sole purpose is to present some concepts of one or more embodiments in a simplified form as a prelude to the more detailed description that is presented later. For convenience, the term some aspects may be used herein to refer to a single aspect or multiple aspects of the disclosure.

Certain disclosed embodiments include a method for delivery of unmanaged over-the-top (OTT) streams in a cellular network. The method comprises monitoring unmanaged OTT streams flow in the cellular network; determining if at least one of the monitored unmanaged OTT streams can be delivered as an OTT stream in a multicast format; reformatting the unmanaged OTT stream into a multicast OTT stream, if the unmanaged OTT stream can be delivered in a multicast format; and delivering the unmanaged OTT stream as a multicast OTT stream to a user edge device over a cellular network.

Certain disclosed embodiments also include a system for delivery of unmanaged over-the-top (OTT) streams in a cellular network. The system comprises a processing unit; and a memory, the memory containing instructions that, when executed by the processing unit, configure the system to: monitor unmanaged OTT streams flow in the cellular network; determine if at least one of the monitored unmanaged OTT streams can be delivered as an OTT stream in a multicast format; reformat the unmanaged OTT stream into a multicast OTT stream, if the unmanaged OTT stream can be delivered in a multicast format; and deliver the unmanaged OTT stream as a multicast OTT stream to a user edge device over a cellular network.

Certain disclosed embodiments also include a method for delivery of unmanaged over-the-top (OTT) streams in a cellular network. The method comprises: receiving an indication that a managed OTT stream is delivered by an operator of the cellular network; provisioning, in real time, multicast resources in the cellular network to deliver the managed OTT stream to a user edge device; and provisioning, in real time, multicast resources in the user edge device to play the unmanaged OTT stream over the user edge device.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
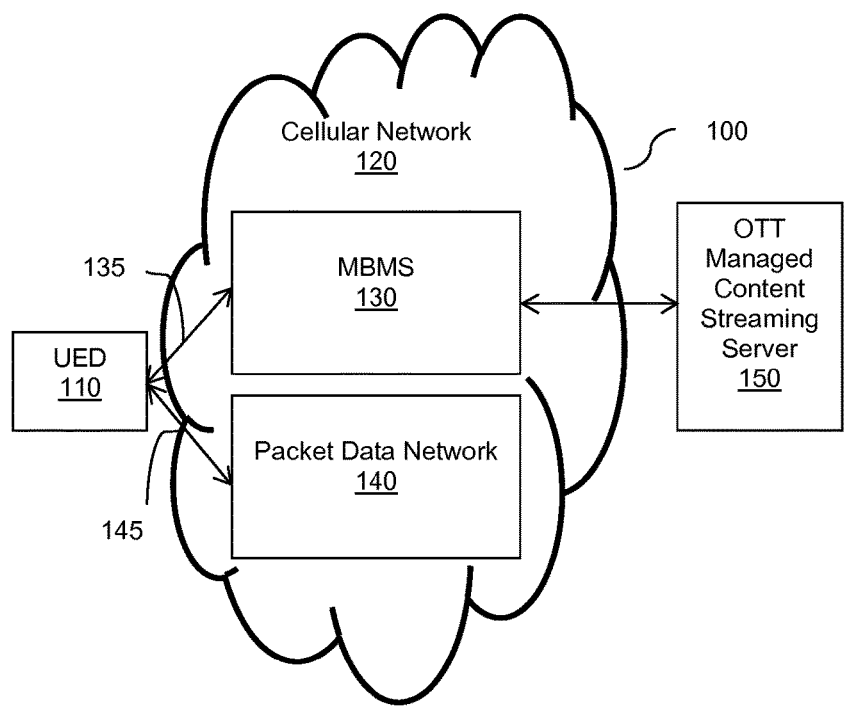
FIG. 1 is a schematic diagram of a cellular network that supports delivery of OTT streams in a multicast format.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 4:
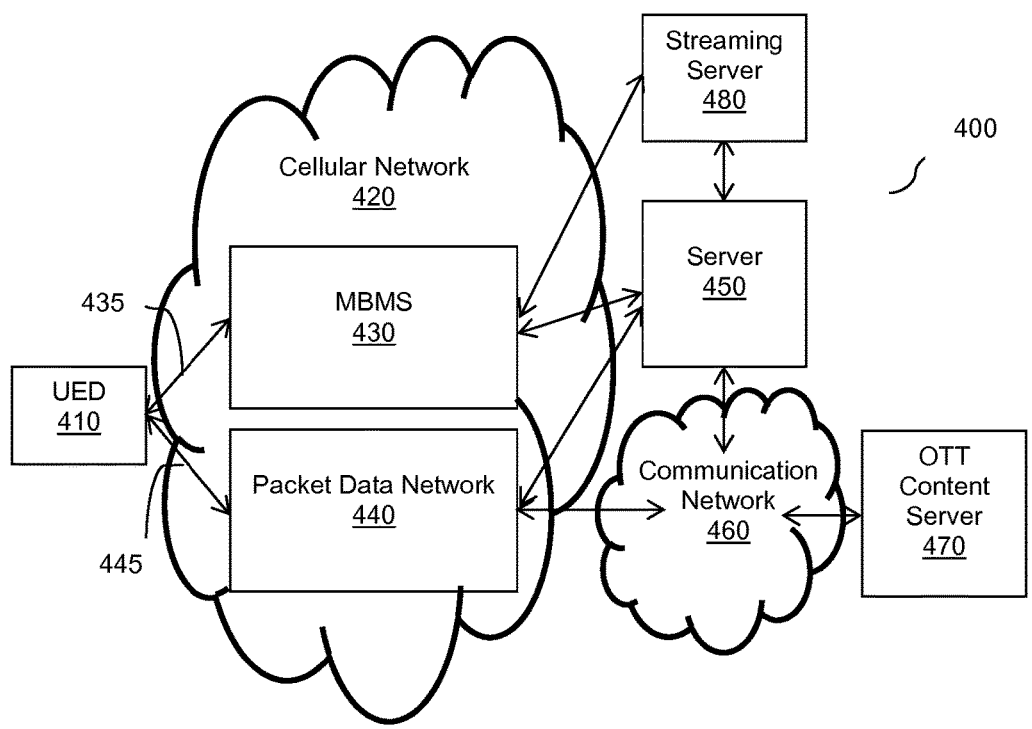
FIG. 4 is a schematic diagram of a multimedia broadband multicast system utilized to describe the various embodiments.
Figure 6:
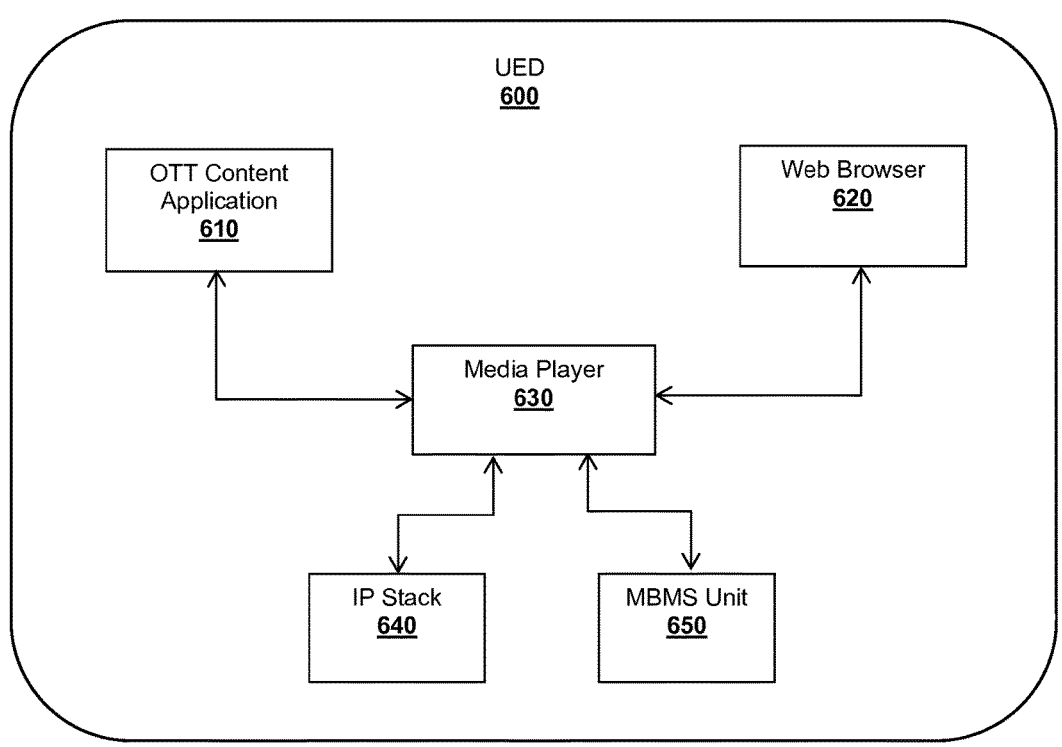
FIG. 6 is a schematic diagram of a user edge device for playing multicast OTT streams received through a multicast channel.

FIG. 4 is a non-limiting and exemplary schematic diagram illustrating a multimedia broadband multicast system 400 utilized to describe the various disclosed embodiments. A user equipment device (UED) 410 is communicatively connected to a cellular network 420 through a unicast communication channel 445 and a multicast communication channel 435. The UED 410 may be, but is not limited to, a personal computer, a smart phone, an electronic kiosk, a tablet computer, a wearable computing device, and the like. The UED 410 is configured to execute a media player from any one of a web-browser, an application (e.g., a mobile app), and the like. In an embodiment, the UED 410 includes an interface to the cellular network 420 and an MBMS (or eMBMS) unit (an exemplary UED containing an MBMS unit is shown in FIG. 6). The MBMS unit may be in a form of hardware, middleware, software, or any combination thereof. It should be noted that any means that provide equivalent functionality to the MBMS or eMBMS can be utilized as well.

At the other end of the system 400, an OTT content server 470 is also communicatively connected to a communication network 460. The communication network 460 may be a local area network, a wide area network (WAN), a metropolitan area network (MAN), the Internet, and the like. The OTT content server 470 locally hosts or receives the multimedia content from its origin (e.g., a studio) in real-time. The OTT content server 470 is configured to stream this content as an OTT content stream to the UED 410 over the cellular network 420 and the communication network 460. OTT content servers (e.g., OTT content server 470) are typically deployed in datacenters in different geographical locations. Although not shown in FIG. 4, OTT content servers are typically connected to CDNs.

According to an exemplary implementation, the OTT content server 470 streams unmanaged OTT content. As noted above, such OTT content refers to content being delivered transparently over the network. As such, the operator of the cellular network 420 does not have any information regarding the type of the content being streamed or the number of concurrent viewers. Also connected to the cellular network 420 is a streaming server 480 that streams managed OTT content. The operator of the cellular network 420 controls the operation of the streaming server 480.

Figure 2:
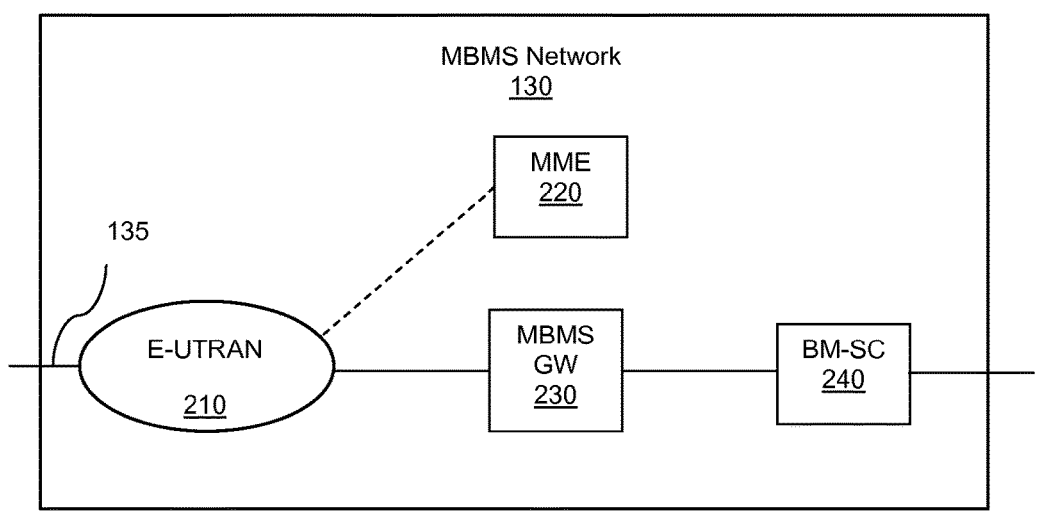
FIG. 2 is a schematic diagram of a MBMS network operable in a cellular network.
Figure 3:
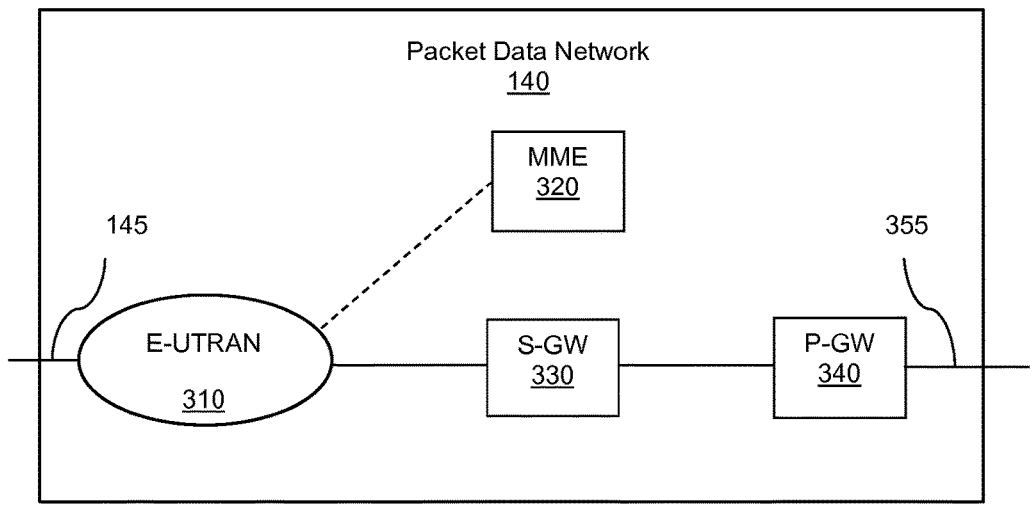
FIG. 3 is a schematic diagram of a packet data network operable in a cellular network.

The cellular network 420 may be operated according to the communication standards defined in any one of the WCDMA, TD-CDMA, TD-SCDMA, and LTE. The cellular network 420 includes two paths for delivery of OTT content: a MBMS network 430, and a packet data network 440. As noted above, the MBMS network 430 can serve and deliver multicast OTT streams while the packet data network 440 carries the unicast data services including unicast OTT streams. The MBMS network 430 is described in further detail herein above with respect to FIG. 2, while the packet data network 440 is discussed in further detail herein above with respect to FIG. 3. As further noted above, a MBMS or eMBMS unit delivers multicast streams of managed OTT content and is typically preconfigured with the streams to be delivered.

A server 450 is communicatively connected to the cellular network 420, the streaming server 480, and the communication network 460. The server is typically configured to perform the embodiments for efficient delivery of unmanaged OTT streams over to the UED 410. To this end, according to an embodiment, the server 450 is configured to monitor OTT streams provided between the OTT client (located at the UED 410) and the OTT content server 470 as well as streams delivered over the communication network 460 and packet data network 440.

The server 450 is configured to determine if a monitored stream should be delivered as a multicast stream and not as a unicast stream. The determination may be based on, for example, one of the following criteria. The requested stream is a live, linear, or replicated OTT stream; a content popularity; and so on. The content popularity can be determined based on a number of UEDs requesting the same stream during a predefined time interval.

Upon detection of a stream that can be multicasted, the server 450 is configured to fetch the content in its unicast format from the OTT content server 470 via the communication network 460. A unicast format may include, but is not limited to, a real time messaging protocol (RTMP), a HTTP live streaming (HLS) protocol, or any other streaming protocol over a transmission control protocol (TCP) connection. The server 450 re-formats the received OTT stream from a unicast format to a multicast format. A multicast format may include, but is not limited to, RTSP over UDP or HTTP objects over UDP.

In order to enable the delivery of a requested OTT stream in its multicast format and the proper display of the requested OTT stream over the UED 410, the server 450 dynamically configures the MBMS network 430 to deliver a multicast stream produced by the server 450 to the UED 410 over the multicast communication channel 435. In addition, the server 450 is configured to set the UED 410 and, particularly, a MBMS (or eMBMS) unit in the UED 410 to tune to a specific multicast channel (e.g., channel 435) and set the player of the UED 410 to request the streamed contents from the MBMS unit. Then, the server 450 injects the OTT stream in its multicast format to the MBMS network.

According to another embodiment, the server 450 is further configured to optimize the delivery of the managed OTT content streamed by the streaming server 480. The server 450 receives an indication that managed OTT content is being delivered over the cellular network 420. Thereafter, the server 450 sets the UED 410 and, particularly, a MBMS (or eMBMS) unit in the UED 410, to tune to a specific multicast channel (e.g., channel 435).

The server 450 also sets the player of the UED 410 to request the steamed contents from the MBMS unit. It should be noted that setting of the UED 410 is typically performed in real-time and does not require any provisions by the operator of the network 420 or a user of the UED 410.

It should be noted that only one UED 410, one OTT content server 470, and one streaming server 480 are illustrated in FIG. 4 merely for the sake of simplicity of the description. The disclosed techniques can be utilized when multiple UEDs, OTT content servers, and streaming servers are operable in the system 400.

Figure 5:
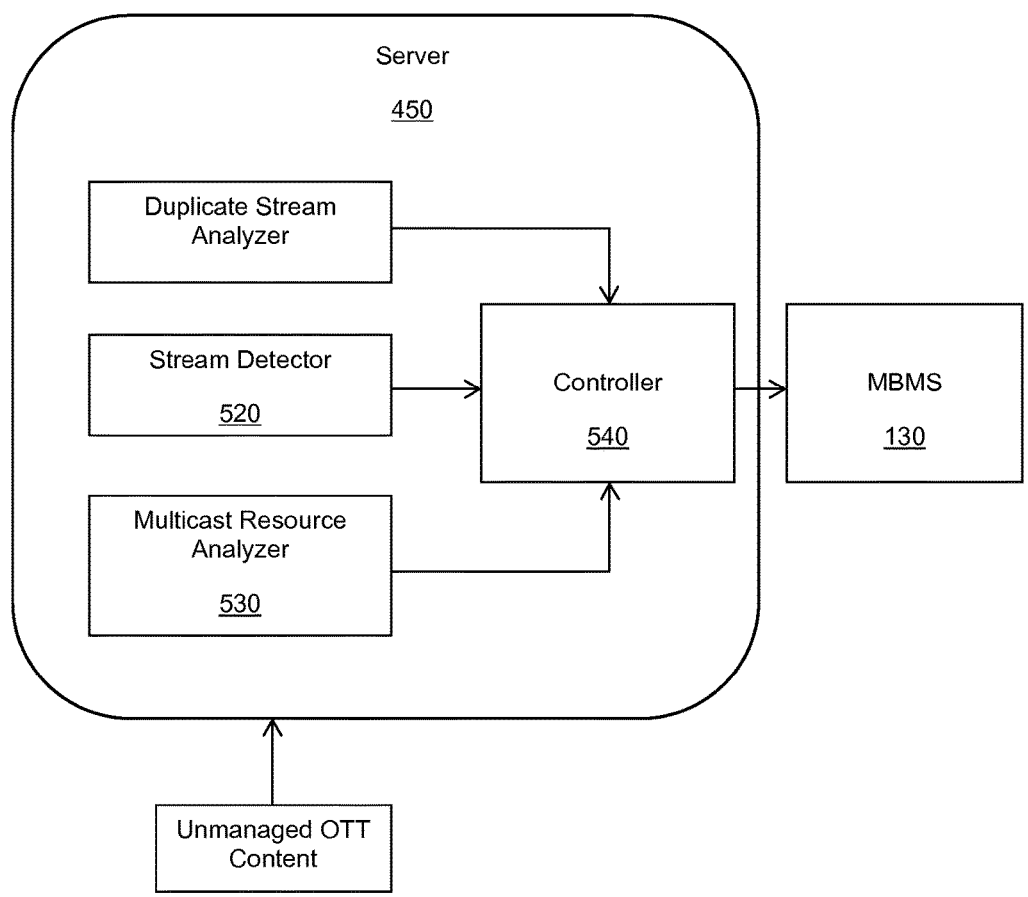
FIG. 5 is a block diagram of a server for efficient delivery of unmanaged OTT streams according to one embodiment.

FIG. 5 is an exemplary and non-limiting block diagram of a server 450 according to an embodiment. In some implementations, the server 450 includes a duplicate stream analyzer 510, a liver stream detector 520, a multicast resource analyzer 530, and a controller 540.

The duplicate stream analyzer 510 monitors traffic flows through a cellular network (e.g., cellular network 120) and identifies OTT streams in real-time. In an embodiment, the duplicate stream analyzer 510 monitors OTT streams flow between UEDs and an OTT content server (e.g., OTT content server 470). In an embodiment, such streams are routed to the duplicate stream analyzer 510 through the data packet network. It should be noted that only certain OTT streams can be routed to the analyzer 510. For example, in an embodiment, only stream targeted to specific destination IP addresses may be routed to the duplicate stream analyzer 510.

In another embodiment, the duplicate stream analyzer 510 may be configured to monitor upstream and downstream links of the cellular network using, for example, a deep packet inspection (DPI) element or service chaining element. In this embodiment, the duplicate stream analyzer 510 may identify requests to OTT streams by extracting or detecting relevant requests for additional processing such as, for example, requests with Port-ID '80' or '8080' or requests that designate a filename containing the M3U8 prefix.

In an embodiment, the duplicate stream analyzer 510 is configured to detect duplicated OTT streams of the same specific content and determine the popularity of such duplicated streams. Duplicated streams can be detected by monitoring requests and responses to such streams. In that embodiment, an OTT stream is determined to be popular if a number of detected corresponding streams exceeds a predefined threshold. A "popular" stream is a candidate to be delivered to the UED as a multicast stream.

The stream detector 520 detects and determines whether an OTT stream requested by the user or provided by the OTT content server is a live, linear, or replicated OTT stream, or any type of OTT stream that can otherwise be multicasted. In an embodiment, such detection may be performed by comparing OTT streams generated by the same source to identify similarities. In another embodiment, such detection may be implemented by analyzing requests and, upon determining that one or more suspected requests have been identified, retrieving multiple time-shifted copies of the same content and searching for similarities in time. An example for the operation of the stream detector 520 can be found in U.S. patent application Ser. No. 14/332,712 filed on Jul. 16, 2014, assigned to the common assignee, and hereby incorporated by reference for all that it contains.

The multicast resource analyzer 530 retrieves information from the MBMS 130 in order to identify the multicast resources available to the cellular network at any given time. The retrieved information may include, but is not limited to, the number of available multicast channels and the available bandwidth for each channel. The MBMS network has a limited number of multicast channels and a limited bandwidth per channel.

The controller 540 is configured to determine, based on the inputs received from the duplicate stream analyzer 510, the multicast resource analyzer 530, and the stream detector 520, if there is a unicast OTT stream which is currently being delivered as unicast that can be transmitted in a multicast format. Such determination may involve consideration of one or more of the following inputs: content popularity, content type (i.e., if the content can be served by multicast), multicast resource availability, and so on. For example, a stream for a popular content would be delivered in a multicast format to the UED over the cellular network if there is at least one available multicast channel for streaming the content in a multicast format.

If such OTT stream is determined to be delivered in its multicast format, the controller 540 reformats the unicast stream into a multicast stream. For example, the stream can be converted from a HLS over TCP format to a HTTP Objects over UDP format.

In an exemplary embodiment, the reformatting of a unicast stream into a multicast stream is performed at two separate layers: an application layer and a transport layer. The processing at the application layer comprises fragmenting a unicast OTT large size transport stream (TS) file into a set of small size (i.e., a having a preconfigured size) TS files. This is performed in order to compensate for the unreliability of a UDP used to transport the multicast traffic. Optionally, reformatting at the transport layer may also be applied by replacing the TCP layer with the UDP layer The controller 540 is further configured to provision the MBMS network 130. In one embodiment, the provisioning of the MBMS network 130 includes configuring a BM-SC (e.g., BM-SC 240) with a set of parameters to establish a new MBMS and to begin injecting the OTT stream into the BM-SC's data interface. The set of parameters may include, but are not limited to, a bandwidth, quality of service (QoS), forward error correction (FEC) parameters, TMGI (multicast group ID), and the like.

In response to provisioning of its operation, the MBMS network 130 announces a multicast channel. The controller 540 also configures the UED 410 (not shown) to receive and play the multicast stream. In an embodiment, this includes tuning a MBMS in the UED 410 to the announced multicast channel, thereby setting the player of the UED 410 to request the streamed content from a MBMS unit. Upon establishing a connection with the UED, the controller 540 begins a session and transfers the multicast stream through the MBMS network (network 130, FIG. 1).

In certain implementations, the server 450 also comprises one or more network interfaces (not shown) to interface with one or more networks (e.g., cellular network 420 and communication network 460, not shown), one or processing systems (not shown), and a memory (not shown), the memory containing instructions to be executed by the processing system. In some implementations, each of the duplicate stream analyzer 510, the stream detector 520, the multicast resource analyzer 530, and the controller 540 may be realized by a processing system. The processing system may comprise or be a component of a larger processing system implemented with one or more processors. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

FIG. 6 is an exemplary and non-limiting schematic diagram of a UED 600 configured to play an OTT stream in a multicast format according to an embodiment. As illustrated in FIG. 6, an OTT content application 610 configured to play OTT content is installed in the UED 600. Alternatively or collectively, a web browser 620 may also be installed in the UED 600. Both the UED 600 and the web browser 620 are connected to a media player 630 installed in the UED 600. The UED 600 also includes a MBMS unit 650 configured to receive OTT content streams in a multicast format. The MBMS unit 650 may be implemented as eMBMS middleware as defined in the 3GPP standard. In an exemplary configuration, the MBMS unit 650 is integrated at the UED 600. In certain embodiments, the MBMS unit 650 may be realized as hardware, software, middleware, or a combination thereof.

The OTT content application 610 and/or web browser 620 request to an OTT content server (not shown) for the content to be viewed. Then, the OTT content application 610 and/or web browser 620 loads the requested content to the media player 630. In this embodiment, since the MBMS unit 650 is fully integrated within the UED 600, the media player 630 can play back content received from the cellular network either as unicast or as multicast streams. In an embodiment, the MBMS unit 650 implements a multicast client toward the cellular network and a unicast server toward the media player 630. That is, the MBMS unit 650 acts as a proxy element between multicast and unicast streams which enables the media player 630 to communicate with the MBMS unit 650 over unicast protocol (e.g., HTTP/MPEG-DASH over TCP), while the MBMS unit 650 receives the content over a multicast channel (e.g., MPEG-DASH over UDP or HTTP objects over UDP).

An OTT operator (not shown) and/or its CDN (not shown) typically streams the content in unicast format. As a result, the media player 630 may issue a request for media in a unicast format from an IP stack 640. Such requests are captured by a server (e.g., the server 450). As a result, the server redirects the request to the MBMS unit 650 in order to obtain the content in its multicast format.

In an exemplary implementation of a redirect procedure, the playlist response sent from an OTT content server is captured by the server 450 by means of a controller (e.g., the controller 540). The playlist is modified such that, instead of requesting the content segments (for example, in HLS, such segments are also known as .TS files) from the OTT content server, such segments are requested from the HTTP server implemented at the MBMS unit 650.

Figure 7:
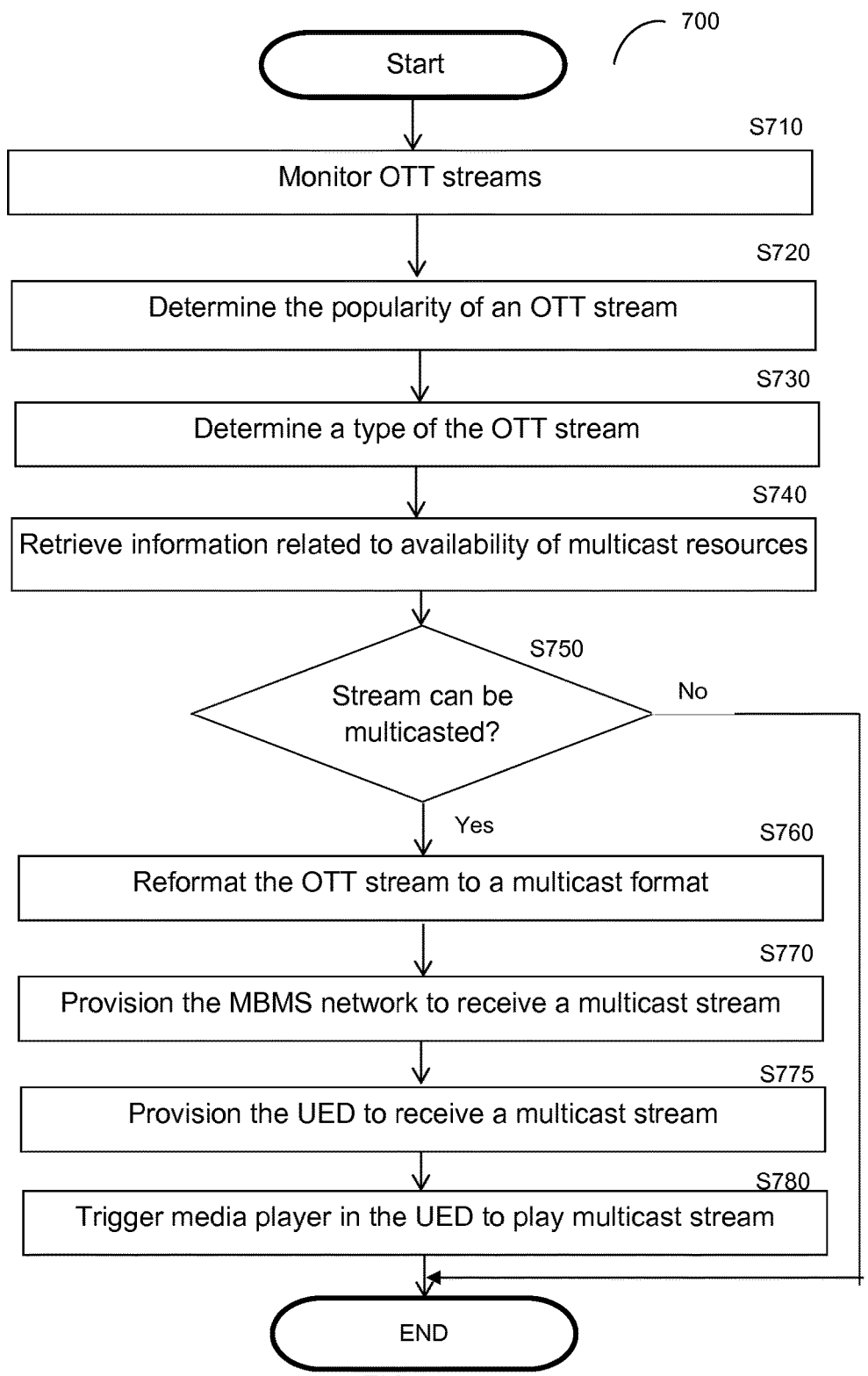
FIG. 7 is a flowchart showing operation of a method for efficient delivery of unmanaged OTT streams according to an embodiment.

FIG. 7 is an exemplary and non-limiting flowchart 700 illustrating operation of the server 450 according to one embodiment. At S710, OTT content streams flow to and from a cellular network are monitored. In one embodiment, such streams can be forwarded by a deep packet inspection (DPI) element, a service chaining element, or a routing network element. The forwarding decision by any of these elements is based on a set of rules such as, but not limited to, a destination IP address designated in the request. The destination IP address may be, for example, an IP address of an OTT content server In S720, the popularity of the requested stream is determined. In an exemplary embodiment, this includes checking if the number of duplicated OTT streams detected during a predefined time interval to a specific OTT stream exceeds a predefined threshold. In such an embodiment, if the number of such duplicated streams exceeds the threshold, the stream is determined to be popular. In various embodiments, popular streams may be suitable for delivery to a UED as multicast streams. As a non-limiting example, if it is determined that 150 or more duplicated streams (i.e., OTT streams to the same content) have been detected during a period of 10 sec, the stream is determined to be popular.

In S730, it is determined if a type of a requested or otherwise delivered stream can be transmitted in multicast format. In various embodiments, streams which are suitable for multicast streaming include, but are not limited to, live, linear, and replicated streams, as well as any other streams which may be multicasted.

In S740, information related to the availability of multicast resources is retrieved. In an embodiment, such information may be retrieved from an MBMS network. Such retrieved information may include, but is not limited to, a number of available multicast channels, an available bandwidth for each channel, and so on.

In S750, it is determined whether the requested or otherwise delivered OTT stream can be multicasted. If so, execution continues with S760; otherwise, execution terminates. Such determination may be based on, but is not limited to, popularity of the stream, multicast resources' availability, a content type of the stream (i.e., whether the stream is of a type that can be transmitted in a multicast format), and so on, and any combinations thereof.

In S760, the requested or otherwise delivered OTT stream is reformatted into a multicast format. As a non-limiting example, a stream may be converted from a HLS over TCP format to a HTTP objects over a UDP format. In an embodiment, reformatting of a unicast stream into a multicast stream may be performed at two separate layers, an application layer and a transport layer. The conversion, in an exemplary embodiment, includes fragmenting a unicast OTT stream into a set of small (i.e., having a preconfigured size) transport stream (TS) segments.

In S770, the MBMS network is provisioned to receive on OTT stream in its multicast format. In an embodiment, triggering of the MBMS network may include configuring a BM-SC (e.g., BM-SC 240) with a set of parameters to establish a new MBMS and to start injecting the OTT stream with the BM-SC's data interface. Such parameters may include, but are not limited to, bandwidth, quality of service (QoS), forward error correction (FEC) parameters, TMGI (multicast group IDs), and the like.

In S775, the UED and, specifically, a MBMS unit in the UED, are provisioned to receive an OTT stream in its multicast format. In S780, an UED media player in the UED is triggered to play the multicast content delivered through the MBMS network using redirection.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

Also, it should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

Although some benefits and advantages of the preferred embodiments are mentioned, the scope of the disclosure is not intended to be limited to particular benefits, uses, or objectives. Rather, embodiments of the disclosure are intended to be broadly applicable to different wireless technologies, system configurations, networks, and transmission protocols, some of which are illustrated by way of example in the figures and in the description.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for delivery of unmanaged over-the-top (OTT) streams in a cellular network, comprising:
    monitoring unmanaged OTT streams flow in the cellular network;
    determining if at least one of the monitored unmanaged OTT streams can be delivered as an OTT stream in a multicast format;
    reformatting the at least one unmanaged OTT stream into a multicast OTT stream, if the at least one unmanaged OTT stream can be delivered in a multicast format;
    delivering the at least one unmanaged OTT stream as a multicast OTT stream to a user edge device over the cellular network;
    provisioning multicast resources in the cellular network to deliver the multicast OTT stream to a user edge device; and
    provisioning multicast resources in the user edge device to receive and play the multicast OTT stream over the user edge device.

2. The method of claim 1, wherein the at least one unmanaged OTT stream is in a unicast format and is not controlled by an operator of the cellular network.

3. The method of claim 1, wherein determining if at least one of the monitored unmanaged OTT streams can be delivered as an OTT stream in a multicast format further comprising:
    determining a popularity of the at least one of the unmanaged OTT streams;
    determining a type of the at least one of the unmanaged OTT streams; and
    determining information related to an availability of multicast resources in the cellular network.

4. The method of claim 3, wherein a type of an unmanaged OTT stream that can be delivered as an OTT stream in a multicast format is any one of: a live OTT stream, a linear OTT stream, and a replicated OTT stream.

5. The method of claim 3, wherein the at least one of the unmanaged OTT streams is determined to be popular when a number of requests to the at least one unmanaged OTT stream exceeds a predefined threshold.

6. The method of claim 3, wherein the information related to the availability of multicast resources in the cellular network is at least one of: a number of available multicast channels, and an available bandwidth for each channel.

7. The method of claim 3, wherein determining if the at least one of the unmanaged OTT streams can be delivered as an OTT stream in a multicast format is based on at least one of: the type of the at least one unmanaged OTT stream, the popularity of the at least one unmanaged OTT stream, and the availability of the multicast resources.

8. The method of claim 1, wherein reformatting the at least one unmanaged OTT stream into a multicast OTT stream is performed on at least one of: an application layer, and a transport layer.

9. A non-transitory computer readable medium having stored thereon instructions for causing one or more processing units to execute the method according to claim 1.

10. A system for delivery of unmanaged over-the-top (OTT) streams in a cellular network, comprising:
    a processing unit; and
    a memory, the memory containing instructions that, when executed by the processing unit, configure the system to:
    monitor a request for unmanaged OTT streams flow in the cellular network;
    determine if at least one of the unmanaged OTT streams can be delivered as an OTT stream in a multicast format;
    reformat the at least one unmanaged OTT stream into a multicast OTT stream, if the unmanaged OTT stream can be delivered in a multicast format;
    deliver the at least one unmanaged OTT stream as a multicast OTT stream to a user edge device over the cellular network;
    provision multicast resources in the cellular network to deliver the multicast OTT stream to a user edge device; and
    provision multicast resources in the user edge device to receive and play the multicast OTT stream over the user edge device.

11. The system of claim 10, wherein the at least one unmanaged OTT stream is in a unicast format and is not controlled by an operator of the cellular network.

12. The system of claim 10, wherein the system is further configured to:
  determine a popularity of the at least one of the unmanaged OTT streams;
  determine a type of the at least one of the unmanaged OTT streams; and
  determine at least one of: a number of available multicast channels, and an available bandwidth for each of the multicast channels in the cellular network.

13. The system of claim 12, wherein a type of an unmanaged OTT stream that can be delivered as an OTT stream in a multicast format is any one of: a live OTT stream, a linear OTT stream, and a replicated OTT stream.

14. The system of claim 12, wherein the at least one of the unmanaged OTT streams is determined to be popular when a number of requests to the at least one unmanaged OTT stream exceed a predefined threshold.

15. The system of claim 12, wherein the information related to the availability of multicast resources in the cellular network is at least one of: a number of available multicast channels, and an available bandwidth for each of the multicast channels.

16. The system of claim 12, wherein determining if the at least one of the unmanaged OTT streams can be delivered as an OTT stream in a multicast format is based on at least one of: the type of the at least one unmanaged OTT stream, the popularity of the at least one unmanaged OTT stream, and the availability of the multicast resources.

17. The system of claim 10, wherein the system is further configured to:
  reformat the at least one unmanaged OTT stream into a multicast OTT stream on at least one of: an application layer, and a transport layer.

18. The system of claim 10, wherein the multicast resources in the cellular network comprise a multimedia broadcast multicast service (MBMS) network and the multicast resources in the user edge device comprise at least a MBMS middleware.

19. A method for delivery of managed over-the-top (OTT) streams in a cellular network, comprising:
  receiving an indication that a managed OTT stream is delivered by an operator of the cellular network;
  provisioning, in real time, multicast resources in the cellular network to deliver the managed OTT stream to a user edge device; and
  provisioning, in real time, multicast resources in the user edge device to play the managed OTT stream over the user edge device.

* * * * *